March 14, 1967  A. L. BERGER ET AL  3,308,958

FILTER

Filed April 3, 1964

United States Patent Office 3,308,958
Patented Mar. 14, 1967

3,308,958
FILTER
Allen L. Berger, Elmhurst, N.Y., Robert Mason, Buena Park, Calif., and David B. Pall, Roslyn Estates, N.Y., assignors to Pall Corporation, Glen Cove, N.Y., a corporation of New York
Filed Apr. 3, 1964, Ser. No. 357,177
9 Claims. (Cl. 210—487)

This invention relates to filter element composites and more particularly to filter structures including a tubular filtering element integrated physically and functionally with its companion parts for use in a filter assembly.

Tubular filter elements are normally held between end caps, either or both of which may be provided with apertures for access to the interior of the filter element, and the filter element itself is supported internally by a core of structurally supporting material. The end caps and associated fittings provide the means for placing the filter element in the filter assembly in a leaktight fit. Frictional clamping, resinous bonds and adhesives, brazing, and welding normally are used to attach the filter element to the end caps, and both filter element and core are normally held by the same caps.

One of the most serious problems encountered in fabricating filter elements is in centering the end caps and fittings on the element, so as to ensure proper placement in the assembly. Unless these are centered precisely, misalignment between the end caps may prevent proper placement of the element in the assembly. There also may be difficulty in tightening the fittings in a leakproof seal.

Another problem is encountered in bonding the end caps to the element and core. In high pressure installations the bonding between the end caps and the filter element frequently proves to be the weak point most subject to failure. A welded structure has been developed, described in U.S. Patents Nos. 3,007,579 and 3,007,238 dated November 7, 1961, which provides a sure seal between the end caps and the filter element. A welded end cap is, however, more expensive to fabricate than a simple soldered, brazed or resin-bonded structure, and in many structures welding may not be feasible.

In accordance with the invention, tubular filter assemblies are provided in which the filter element and core are surely centered on the end caps and the end caps positively positioned with respect to each other, in a manner to permit bonding of the element thereto in a simple fluid-tight seal using conventional adhesives or bonding agents. For this purpose, the end caps and core are specially designed so that the core, which is the more rigid component of the two, projects beyond the filter element at each end, and thus serves to positively position the end caps thereon, and the end caps are shaped accordingly, so as to embrace both the end of the core and the end of the tubular filter element. For instance, the end caps can be provided with a socket to receive the core end in a snug and preferably press fit, and with flanges to receive the filter element end in a snug fit at a point spaced from the core socket. It is accordingly possible, after placing the core and filter element in the end cap, to run the fluid-bonding agent in to the joint between the end cap and the core and element, and fill the space up to the flanges. The bonding agent is then hardened to form the seal. The bonding agent must form a leakproof seal between the ends of the filter element and the end cap, and also may form such a seal with the core, and it also provides the bonding force necessary to hold the filter element composite together under high pressures, with the core centering the end caps so that they are correctly positioned, such as concentric, with respect to each other.

The structure of the invention is applicable to tubular filter elements of any cross-sectional configuration, including circular, rectangular, square, elliptical, polygonal and other shapes, which can be regular or corrugated, as desired. When the tube is corrugated or folded, so that it has a substantial depth, in cross section, as opposed to a line in cross-section, it is usually preferable to compress the structure ends as in U.S. Patent No. 3,007,238 so that they form a more regular thin cross-section, for better fitting within the enclosing end caps, and for facilitating the formation of a liquid-tight seal at the end caps.

The basic filter composite structure can be modified in various ways to accommodate the necessary design requirements. Thus, for example, the end caps can be formed integrally with various coupling elements, supplementary support elements, relief valve assemblies, and the like. Such structures are well known in the filter art.

The tubular filter element component can comprise a single filter element or a plurality of such elements, in layers, all enclosed within common end caps. Plural layers of the same or of various mixed types can be used. For instance, two wire meshes of different mesh structure can be used. A fibrous mat can be sandwiched between two layers of wire mesh of different types, and corrugated in the usual manner. As another illustration, the filter element can include a finely divided unbonded fibrous mat and an intermediate membrane filter downstream thereof, both enclosed within structurally-supporting wire mesh. The membrane filter is adapted to trap any fibers from the mat which might tend to move downstream.

It will be apparent from the above that any type of filter element can be employed in the structure of the invention. In order to facilitate bonding of the filter element to metal end caps in a fluid-tight seal, using a metal seal, such as a braze, the filtering layer can be made of metallic material.

In place of braze, any liquid adhesive can be employed, such as a molten thermoplastic resin composition or a liquid thermosetting or themoplastic resin composition, in a partial stage of polymerization, which is then hardened by completing polymerization by heat. Typical liquid bonding agents that can be used include phenol-formaldehyde resins, epoxy resins, polycarbonate resins, urea-formaldehyde resins, polyallyl resins and the like. Thermoplastic resins can be melted, and will form a tight bond when hard. Typical thermoplastic resins include polyethylene, polypropylene, polyvinyl chloride, polymethyl methacrylate, polystyrene and polyvinyl butyral.

The outermost layer of the filter can be in the form not only of a wire mesh filter but also of perforated sheet and the like, and need not necessarily constitute the principal filtering component of the structure, but may simply serve as an external cover or support for the principal filter element, which may for example be made of fibrous material, plastic material and the like, as required for dirt removal in the fluid system.

Any type of rigid core support can be used for the filter element. Tubes of perforated sheet are preferred. The core support can be made of metallic material, or of plastic material, such as polytetrafluoroethylene, nylon, polycarbonates, and polystyrene. It is not necessary that a leak-proof seal be formed between the core and the end caps, but this is usually desirable. The core can, for example, be simply held between the end caps in a press fit, the only bonding being provided at the joint between the filter element or filter mesh and the end cap. The core support will normally provide the internal support for the filter, but, if desired, external cores can be provided in addition.

The drawings illustrate preferred embodiments of the invention.

Figure 1:
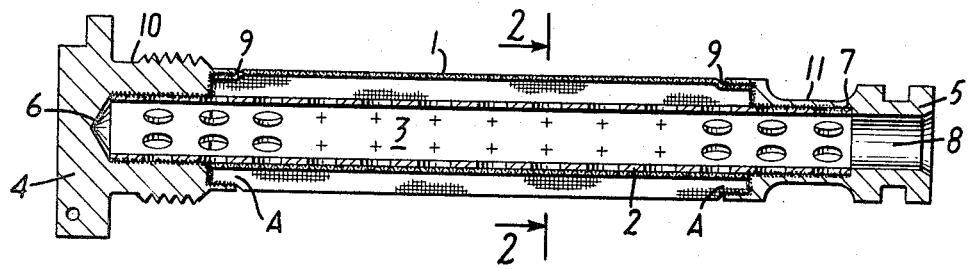
FIGURE 1 is a view in longitudinal section of a tubular filter element composite in which the filter element is formed of wire mesh and the core of perforated metal sheet, both brazed to and held by metal end caps.

The tubular filter element composite shown in FIGURE 1 comprises a corrugated sinter-bonded wire mesh 1, made of stainless steel and prepared in accordance with U.S. Patent No. 2,925,650, supported internally by a cylindrical perforated metal core 2, also of stainless steel, and enclosing an internal passage 3. The composite is held between end caps 4 and 5 made of stainless steel.

End cap 4 is provided with a socket 6, nicely conforming to the external diameter of the core 2 so that the latter is snugly held therein in a press fit. End cap 5 is provided with a corresponding recessed socket 7, also embracing the core in a press fit, and opening into a central aperture 8 extending straight through the end cap 5 and thus providing access to the internal passage 3 enclosed by the core and filter element. The end caps 4 and 5 are centered concentrically on the core 2.

The core 2 and filter element 1 are held in the sockets 6 and 7 by a silver braze 9, which furnishes a leakproof seal between the filter element and the end cap. Nicrobraze, silver solder and tin solder also can be used. Thus, the only way in which fluid externally of the filter element 1 can pass to the central passage 3 is through the filter. The brazed joint is sufficiently strong to withstand pressures of the order of 90 to 3000 p.s.i.

The end caps 4 and 5 are provided with circumferential grooves 10 and 11 for the reception of gaskets to ensure a leakproof seal with the fluid connections to the remainder of the system. The filter element shown is adapted to be used in a cavity in an integrated hydraulic package.

In operation, the filter unit shown is adapted to be used in the following manner. Fluid to be filtered is introduced externally of the filter element 1 and passes through the filter element 1 and core 2 into the central passage 3. The resulting filtrate is then withdrawn through the passage 8 of the end cap 5, whence it leaves the filter element. Appropriate configuration of the end caps 4 and 5 will make it possible to employ the unit in any type of fluid system.

Figure 2:
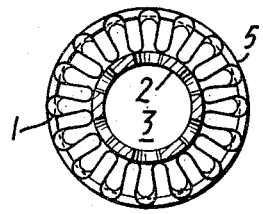
FIGURE 2 is a view in cross-section, taken on the line 2—2 of FIGURE 1 and looking in the direction of the arrows.

The filter element shown in FIGURES 1 and 2 is readily prepared in the following manner. A sheet of wire mesh of the type employed in the element it corrugated, and then made into a cylindrical configuration. The perforated cylinder core is then formed by rolling a sheet of perforated material into a cylinder. About ⅛ inch of the ends of the element 1 are compressed and densified up to 95% and preferably from 10 to 50% to a circular configuration slightly less deep than the normal depth of the element wall, and the core is then inserted into the tube so that both ends extend beyond the compressed ends of the filter cylinder to the same distance. End caps 4 and 5 respectively are then pushed over the ends of the core and filter composite. Finally, the braze is melted into the socket by running it in at point A, where the filter element adjoins the enclosing flange of the end caps. Preforms can also be used. Initially, the tubular element can be so placed that, for example, the end cap 4 is at the bottom, the braze running in readily under these conditions, and then inverted so that the cap 5 is at the bottom and the process repeated. The completed filter element composite is ready for use as soon as the braze has hardened.

The following is claimed:

1. A filter assembly comprising a generally tubular filter element, an internal supporting core disposed within the filter element, said core having sides and ends which extend for a substantial distance beyond the extreme of each end of the filter element, and end caps bonded to and closing off the ends of the filter element in a fluid-tight seal, each of said end caps having a portion receiving said core in axial alignment therewith and closely enclosing the sides and ends of the core extending beyond the extreme ends of the filter element, and engaging such sides at a plurality of points, each of said extending sides of said core forming guide surface means for positioning each said end cap on the assembly to align said end caps with respect to said core and filter element.

2. A filter composite in accordance with claim 1 in which the filter element is of corrugated configuration.

3. A filter composite in accordance with claim 2 in which the end caps embrace the ends of the filter element and in which the corrugations are collapsed and densified in the ends embraced by the end caps.

4. A filter composite in accordance with claim 1 in which said core sides are bonded to each end cap.

5. A filter composite in accordance with claim 1 in which the end cap portions are sockets for reception of said core sides and external flanges for reception of the ends of the filter element.

6. A filter composite in accordance with claim 5 in which said core sides are held within the end caps in a press fit.

7. A filter composite in accordance with claim 1 in which the filter element is made of wire mesh.

8. A filter composite in accordance with claim 1 in which the bonding agent is a braze and the end caps, core and filter element are made of metallic material.

9. A filter composite in accordance with claim 1 in which the bonding agent is of synthetic plastic material.

References Cited by the Examiner

UNITED STATES PATENTS

| | | | |
|---|---|---|---|
| 2,035,758 | 3/1936 | Pierce | 210—497.1 X |
| 2,468,862 | 5/1949 | Briggs | 210—493 X |
| 3,007,238 | 11/1961 | Pall | 210—493 X |

FOREIGN PATENTS

| | | |
|---|---|---|
| 669,710 | 1/1939 | Germany. |
| 880,469 | 10/1961 | Great Britain. |

REUBEN FRIEDMAN, *Primary Examiner.*

SAMIH N. ZAHARNA, D. M. RIESS,
*Assistant Examiners.*